UNITED STATES PATENT OFFICE.

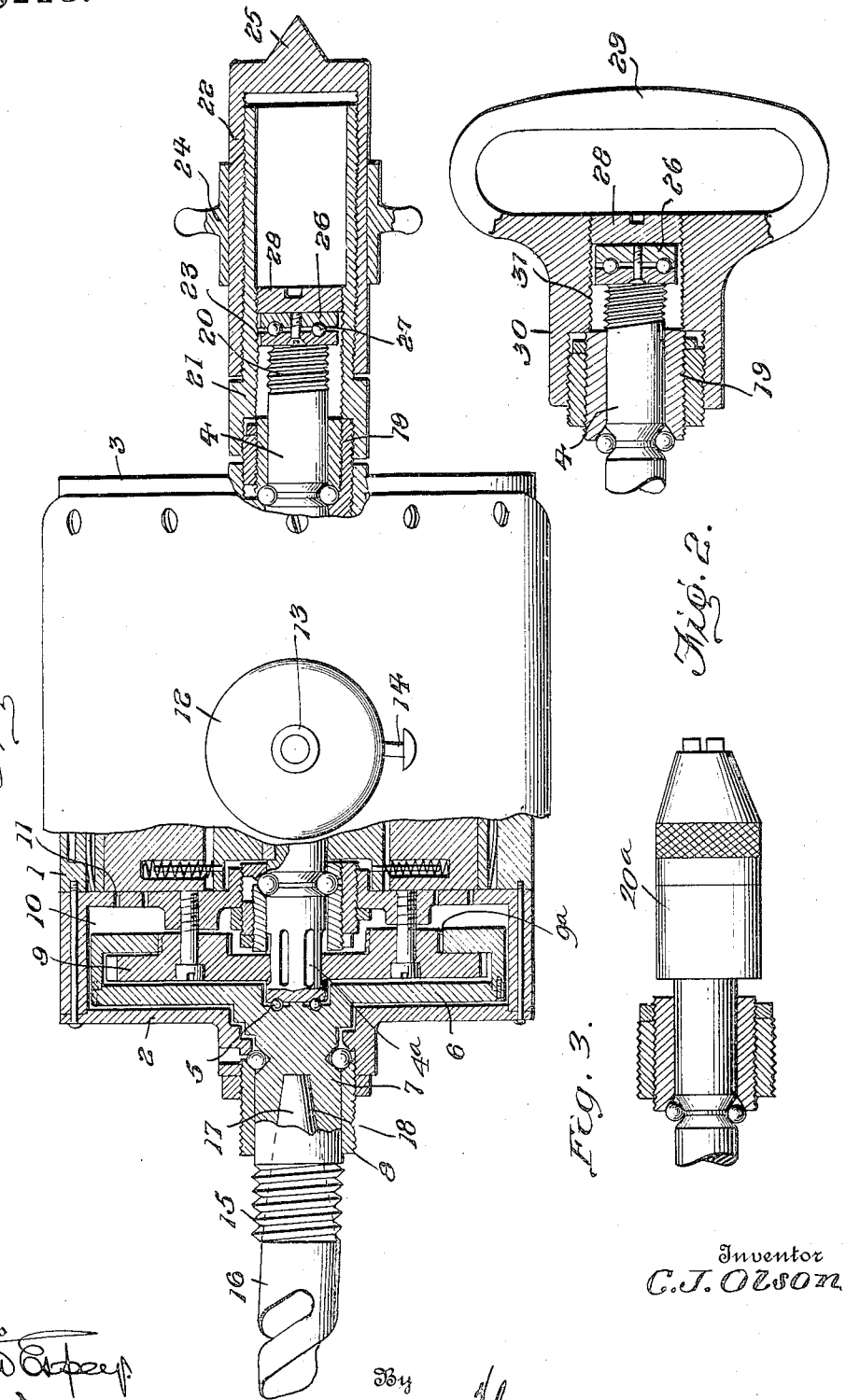

CHARLES J. OLSON, OF MUSKEGON, MICHIGAN.

BORING AND DRILLING MACHINE.

1,132,113.   Specification of Letters Patent.   Patented Mar. 16, 1915.

Original application filed January 7, 1913, Serial No. 740,695. Divided and this application filed June 7, 1913. Serial No. 772,342.

*To all whom it may concern:*

Be it known that I, CHARLES J. OLSON, citizen of the United States, residing at Muskegon, in the county of Muskegon and State of Michigan have invented certain new and useful Improvements in Boring and Drilling Machines, of which the following is a specification.

This invention relates to boring and drilling machines of the motor-driven hand type, such for example, as shown and described in my co-pending application for patent on pneumatically operated chain saws, filed Jan. 7, 1913, Serial No. 740,695, of which this application is a division.

It is one aim of the present invention to provide a boring and drilling machine of the type mentioned which may be readily and conveniently employed in drilling both wood and metal and which is so constructed that the drill holding chuck may be driven at high or low speed, depending upon the nature of the material upon which work is to be done.

It is another aim of the invention to so construct and arrange the machine that the same may be supported solely by hand or may be braced against a support adjacent to the work, and may, when in the latter position, be fed in the direction of the work.

For a full understanding of the invention reference is to be had to the following description and accompanying drawing, in which:—

Figure 1 is a view partly in elevation and partly in section, illustrating the boring and drilling machine embodying the present invention. Fig. 2 is a vertical sectional view illustrating a handle which may be employed in connection with the machine. Fig. 3 is a detail view partly in section and partly in elevation, illustrating the manner in which a chuck may be attached to one end of a motor shaft.

Corresponding and like parts are referred to in the following description and indicated in all the views of the accompanying drawing by the same reference characters.

In the machine embodying the present invention the motor is of the compressed air type and the motor-shaft is provided at one end for the direct connection of a chuck whereby the chuck may be driven at a high rate of speed, the other end of the shaft being geared with a rotating chuck supporting element so as to drive the same at a relatively low rate of speed, and inasmuch as the construction and arrangement of the motor does not affect the remainder of the structure, a specific description thereof is unnecessary and will not be entered into.

The casing for the motor is indicated by the numeral 1 and the heads of the casing are indicated at 2 and 3, the motor-shaft indicated in general at 4 being mounted for rotation through the head 3 and at its other end being journaled as at 5 axially in a head 6. The head 6 is provided upon its outer face with an extension 7 which constitutes a chuck, as will presently be made clear. The head 2 of the casing is formed or provided with a laterally projecting sleeve bearing 8 in which the member 7 is rotatably fitted.

It will be apparent by reference to Fig. 1 of the drawing that the shaft 4 may rotate independently of the head 6 and its chuck portion 7 and it will further be noted by reference to the said figure that a system of planetary gearing including a series of double gears 9 and an internal gear 9ª carried by the head 6 serves to transmit motion from the shaft 4 to the said head 6, at a relatively low rate of speed, the shaft 4 having a gear portion 4ª with which the gears 9 mesh. The head 6 is located immediately beside the head 2 and it and the system of gearing are arranged within a divided portion of the casing indicated at 10 and constituting also the exhaust chamber, it being in communication with the casing through the medium of openings 11 formed therein. One of the handles for the machine is indicated in general by the reference numeral 12 and is illustrated as extending laterally or radially from the cylindrical casing for the motor, the handle being provided with an intake pipe 13 which projects beyond the end thereof and to which may be connected a rubber tubing, or the like, for conveying the air under pressure. The controlling or throttle valve-button of the machine is located upon the handle 12 and is indicated at 14 and, as will be readily understood, is to be pressed for the purpose of admitting air under pressure to the motor.

The chuck 7 extends beyond the end of the sleeve bearing 8 in which it is journaled as clearly illustrated in Fig. 1 of the drawings and is exteriorly threaded as indicated at 15 so as to permit of the fitting thereto of a different style of chuck, or a tool of some character not adapted to fit within a chuck. The tool, here illustrated, however, and indicated by the numeral 16, is provided with a tapered shank 17 which is snugly fitted in a tapered socket 18 formed in the said chuck 7.

In Fig. 1 of the drawing the machine is illustrated as adapted for disposal against a support, located adjacent the work or material to be acted upon by the machine and in the said figure the numeral 19 indicates a sleeve bearing which corresponds to the sleeve bearing 8 except that it journals the shaft 4, the said shaft being threaded at its end as at 20, for the attachment of a chuck as shown in Fig. 3 and indicated at 20ª. The support and feeding device above mentioned comprises essentially a sleeve section 21 and a sleeve section 22. The section 21 is interiorly threaded as indicated at 23 and is fitted onto sleeve bearing 19 so as to be rigid with relation to the same. The sleeve section 22 is also interiorly threaded and is adjustably fitted onto the section 21 and is provided with a finger-piece or with a series of finger-pieces extending circumferentially thereof and indicated by the numeral 24 whereby the said section 22 may be rotated to move it toward or away from the casing head 3.

In order that the machine may securely engage against a support arranged adjacent the work, the sleeve section 22 at its closed end is provided with a conical pointed stud 25 designed to bite into the said support to such extent as to prevent its dropping down while the machine is in use. Arranged within the threaded portion of the sleeve section 21 is a head having spaced sections 26 between which are interposed bearing balls 27. The said head is disposed against a plug 28 which is adjustably threaded into the said section 21 and by reference to Fig. 1 of the drawings it will be apparent that the shaft 4 at its threaded end 20 bears or rests against the adjacent one of the head sections 26 and that by reason of such construction rapid rotation of the shaft 4, even when pressure is applied thereagainst in the direction of its length, is provided for.

It will now be apparent that when the machine is placed in position with the tool 16, or a tool of some other type, supported in a like manner, engaging against the work or material, and the support against which the machine is to be braced has been properly positioned with respect to the work, the finger-pieces 24 may be engaged and the sleeve section 22 may be rotated upon the section 21, thereby increasing the length of the sections. After the pointed spur 25 has been brought into sufficiently firm engagement with the support to prevent the dropping of the machine, the motor may be started, whereby to impart rotary movement to the tool and as the tool enters the work the finger-pieces 24 may be turned so as to feed the machine bodily forwardly, with the exception of course, of its said portion 22.

It will be observed from an inspection of Fig. 1 of the drawing that the handle 12 may be grasped for the purpose of assisting in supporting the machine and in holding the machine in position to act upon the work while the parts are being adjusted.

While the feeding device will probably only be employed when the chuck 7 is driven at a low rate of speed and the tool carried thereby is presumed to be acting upon metal and a slow but positive feed is required, the feeding device, may if desired, be employed when the chuck end 20 of the shaft 4 is in use. Under such circumstances, however, the tool which would be carried by the chuck, would in all probability be intended for wood-work and the feed secured by the feeding device would be too slow to secure the proper results. In order to render the use of the machine more nearly universal, I have provided the handle shown in Fig. 2 of the drawing, the same including a grip 29 and a tubular head or body portion 30 which is interiorly threaded as indicated at 31. A plug 28 and head 26 corresponding to these parts, as previously described, are arranged adjustably within the bore 31 and to this extent the parts shown in Fig. 2 which appear also in Fig. 1, are indicated by corresponding reference numerals, and it may be briefly stated that they perform the same functions, as previously described.

It will be understood, of course, that any arrangement of planetary gearing may be provided for the purpose of transmitting power from the motor shaft to the chuck so long as the chuck is driven at relatively slow speed and in a right-hand direction.

Having thus described the invention what is claimed as new is:—

1. In a device of the class described, a motor including a casing, a gear casing connected with the motor casing and lying beside the same, the motor shaft projecting at one end into the gear casing and having a gear portion, a series of double gears each having one portion meshing with the said gear portion of the motor shaft and located within the gear casing, a chuck rotatably mounted in one wall of the gear casing, and an internal gear carried by the chuck and meshing with the other portion of the first-mentioned series of gears.

2. In a device of the class described, a motor including a casing, a gear casing disposed beside the motor casing, the motor shaft projecting into the gear casing and having a gear portion, a series of gears mounted for rotation in the motor casing and each having a portion meshing with the gear portion of the motor shaft and a gear portion of less diameter than the first mentioned gear portion, a chuck carried for rotation in one wall of the gear casing, and an internal gear carried by the chuck and meshing with the second mentioned gear portions of the said series of gears.

3. In a device of the class described, a motor including a casing, the motor shaft extending through the casing and provided at one end with a gear portion, a chuck journaled exteriorly of the casing, gears meshing with the gear portion of the shaft, an internal gear carried by the chuck and meshing with the first mentioned gears, and means at the other end of the shaft for the attachment of a chuck, or the like.

4. In a device of the class described, a shaft, a motor mounted upon the shaft and arranged to rotate the same, a chuck arranged at one end of the shaft, an extensible support at the other end of the shaft, and a thrust bearing adjustably carried by the extensible support and bearing at the corresponding end of the said shaft.

5. In a device of the class described, a shaft, a motor mounted upon the shaft and arranged to rotate the same, a chuck arranged at one end of the shaft, an extensible support at the other end of the shaft, and a thrust bearing adjustably carried by the extensible support and bearing at the corresponding end of the said shaft, the said support including relatively adjustable telescopic members.

6. In a device of the class described, a motor including a casing, a gear casing disposed beside the motor casing, a removable head closing the gear casing, the motor shaft having a gear portion projecting within the gear casing, a chuck mounted for rotation in the said head of the gear casing and provided, within the said casing, with an internal gear, gears mounted within the gear casing and meshing with the gear portion of the shaft and with the internal gear, and means at the end of the shaft opposite the end at which the chuck is located, for the attachment of a chuck.

In testimony whereof I affix my signature in presence of two witnesses.

CHARLES J. OLSON. [L. S.]

Witnesses:
 CHARLES W. BEERS,
 FRANK E. HATHAWAY.